United States Patent
Ehnes et al.

(10) Patent No.: US 8,317,241 B2
(45) Date of Patent: Nov. 27, 2012

(54) HARSH ENVIRONMENT ROBOT END EFFECTOR

(76) Inventors: Dean Ehnes, Vancouver, WA (US);
Theodore Vanderheyden, Vancouver, WA (US); Travis White, Vancouver, WA (US); Jason Brewer, Vancouver, WA (US); Bill Polly, Vancouver, WA (US)

( * ) Notice: Subject to any disclaimer, the term of this patent is extended or adjusted under 35 U.S.C. 154(b) by 298 days.

(21) Appl. No.: 12/701,424

(22) Filed: Feb. 5, 2010

(65) Prior Publication Data

US 2010/0201143 A1  Aug. 12, 2010

Related U.S. Application Data

(60) Provisional application No. 61/150,521, filed on Feb. 6, 2009.

(51) Int. Cl.
  *B25J 15/08* (2006.01)
(52) U.S. Cl. ............. 294/2; 294/86.4; 294/192; 901/37
(58) Field of Classification Search ........... 294/2, 67.31, 294/81.51, 86.4, 192, 198, 206, 119.3; 901/37
See application file for complete search history.

(56) References Cited

U.S. PATENT DOCUMENTS

| 3,386,763 | A  | * | 6/1968  | Ottaway et al. .......... 294/61 |
| 4,182,442 | A  | * | 1/1980  | Jones .................. 198/418.3 |
| 4,254,984 | A  | * | 3/1981  | Abraham et al. ......... 294/206 |
| 4,592,692 | A  | * | 6/1986  | Suizu et al. ............ 414/792.8 |
| 4,621,852 | A  | * | 11/1986 | Maki .................... 294/86.4 |
| 7,887,108 | B1 | * | 2/2011  | Cawley et al. ............. 294/2 |
| 8,011,708 | B2 | * | 9/2011  | Becker et al. ........... 294/196 |

OTHER PUBLICATIONS

U.S. Appl. No. 12/699,832, USPTO Office Action date Feb. 16, 2012.

* cited by examiner

*Primary Examiner* — Dean Kramer
(74) *Attorney, Agent, or Firm* — Rylander & Associates PC; Mark E. Beatty; Kurt M. Rylander

(57) ABSTRACT

A harsh environment robot end effector includes an end effector frame connectable to a material handling robot, one or more pickup arms rotatingly coupled to the frame, and pickup arm airbag actuator air bags for opening and closing the pickup arms. One or more positioning palms may be provided, which are rotatingly coupled to the end effector frame and provided with actuator air bags for opening and closing. One or more adjustable pushdowns having airbags attached to their heads are provided to grip a load between the pushdown and pickup arm. A mechanical synchronizer may be provided to couple the pickup arms.

9 Claims, 9 Drawing Sheets

HARSH ENVIRONMENT ROBOT END EFFECTOR

CROSS REFERENCE TO RELATED APPLICATIONS

This application claims priority to U.S. Provisional Patent Application Ser. No. 61/150,521, filed Feb. 6, 2009.

FIELD OF THE INVENTION

The present invention relates to robot end effectors. More particularly, the present invention relates to improvements to material handling robot end effectors for use in harsh operating environments.

BACKGROUND

Programmable material handling robots have been in use for some time. Typically such robots include an articulated (i.e. jointed) arm or mobile (i.e. rail mounted) arm with an end effector mounted at the end of the arm. The end effector is the part of the robot that directly interfaces with its environment. For material handling robots this generally includes a gripper of some sort—either with two or more opposing grip pickup arms which close together to grip a load, or single grip arm which closes against a fixed piece to grip a load.

Material handling robots used in conjunction with automated or semi-automated production lines provide numerous advantages in efficiency, accuracy and endurance that make them preferable to having personnel perform such operations manually. Work force head counts may be markedly reduced by replacing line workers with robots for repetitive tasks and providing a small cadre of technical staff to support the robots. Material handling robots are also extremely useful in situations where precise and/or highly repeatable placement is required.

Replacing personnel with robots reduces injuries in jobs heavy lifting or awkward movements, especially repetitive movements, and in potentially dangerous or harsh environments which might threaten employee health with prolonged exposure. Examples of such harsh environments include production and material handling lines for dry concrete powder, silica, powder detergents, salt, fertilizers, aggregate, sand, alumina, mortar, grout, clay and other environments where abrasive products or harsh chemicals are manipulated and moved. Although the bags of concrete powder, for example, are closed, handling bags still generates clouds of concrete dust. This dust is unhealthy to breathe and may irritate mucous tissues, such that workers handling the bags are required to wear dust masks or respirators, safety goggles and gloves for protection. This would be an ideal situation to replace humans with robots.

However, the dust generated is also extremely abrasive and corrosive due to the hardness of the dust and frequently the high alkalinity or acidity of the materials which breaks down lubricants and can corrode aluminum, brass, copper and non-stainless steel parts, as well as many plastic materials. Robot components are frequently fabricated from aluminium to save weight. Brass fittings are frequently used in pneumatic systems due to resistance to corrosion from moisture.

Many material handling robot end effectors utilize pneumatic cylinder actuators to grasp, manipulate and release materials. These cylinder actuators have a very short operating life in such environments. The primary failure modes are the wear surfaces between the cylinder seal—cylinder bore (i.e. internal to the cylinder) and the cylinder rod—wiper seal (i.e. external), and the wear surfaces at the clevis joints where the cylinder rods connect to a load (e.g. a robot finger, clutch plate, etc.). Cylinder failure occurs through abrasion of the seals or internal cylinder walls which causes binding and allows air pressure to leak out, thereby seizing the cylinders. Guided cylinders include guide rod bearings which are vulnerable to fouling, erosion and failure, and which thereby cause the operating cylinder to seize. Bushing wear from abrasive materials opens tolerances, accelerating wear, and can cause moving parts to misalign or impact with each other, leading to robot crashes and/or fatigue failures. Joints fail through fouling of lubricants and erosion of bearing surfaces and binding from dust buildup. Higher operating speeds, with consequently greater friction and higher loads on wear surfaces, accelerate component failure.

Abrasion may be compounded by corrosion caused by the compounds within the dust. For example, concrete dust is highly alkaline, which is destructive to cylinder and end effector components made from aluminum. Some plastic fittings and bearing surfaces may also become brittle and crack. Lubricants tend to break down in such environments. Dust accumulation may also tend to have high hydroscopic cross section which draws in moisture from the atmosphere thereby exacerbating the problems. The lubricants required by air cylinders and associated wear parts actually attract dust to the friction surfaces that the lubricants are intended to protect, thereby exacerbating the wear problems discussed above.

The problems resulting from the accelerated component failure in harsh environment include excessive maintenance labor, replacement parts costs, production downtime, and product loss from mishandling by robots with end effectors which fail to operate properly.

Past solutions to harsh environment problems have focused primarily on making wear surfaces with more wear-resistant and/or corrosion resistant materials such as stainless steel or hardened carbon steel, adding air purge systems to prevent excessive dust accumulation on of equipment, installing wear components within flexible sleeves, bellows or boots, and adding sacrificial wear plates or sleeves to high friction points which are less expensive to replace than the entire component. These solutions are not ideal, add significant expense due to higher fabrication costs (e.g. stainless steel and carbide steel components), and still may impose high maintenance requirements even if failure timing becomes more predictable.

Additional problems with handling bags of powder or loose granular materials such as aggregate or seed is that such bags lack rigidity. In order to increase the robot operating speeds means must be provided to clamp the bags to prevent them from shifting in the end effector during movement. Prior solutions have focused on using pushdown plates operated by a pneumatic cylinder to maintain pressure on a bag after gripping with an end effector, but the pushdown plate cylinders suffer the same drawbacks as described above in harsh environments.

The inventors have found that many of the problems of harsh operating environments are better solved by designing end effectors to substantially reduce the number of wear surfaces by using alternative, non-traditional actuation methods, and linking components to achieve adequate range of motion for end effector components but with shorter stroke lengths of the pneumatic actuators. The inventors have found that end effectors constructed using airbags rather than cylinders eliminates many wear surfaces entirely. The use of airbags rather than cylinders eliminates entirely the wear surfaces between the cylinder seal and chamber and the cylinder rod and wiper. The use of pusher plates rather than clevis joints also eliminates a substantial number of wear surfaces. Airbags can be fabricated from chemically resistant rubber or polymer materials which won't be damaged by sliding friction as frequently happens to coated cylinder components, Airbags do not require lubrication which attracts dust to wear surfaces.

Airbags may also be used to hold down bags after pick up by the end effector to prevent shifting during movement and ensure stacking efficiency. Airbags are less susceptible to fouling and failure, as described above, and are also less likely to tear or damage a powder bag than a contact plate. Airbags will tend to distribute pressure more evenly over the contact surface because the airbag is more malleable compared to a plate. Providing a firm clamp or grip on bags of powder also permits alternative stacking geometries which can be more stable. For example, an end effector may position itself skewed or offset toward a selected end of a bag prior to pickup, such that it grips the bag firmly but the opposing end hangs free to a certain degree. When unloading the powder bag, the free-hanging end will contact first, so the robot can then release the gripped end and lay the bag down in a controlled fashion. This control also facilitates stacking the bags in an overlapping crisscross pattern for greater overall stability of the stack.

Pneumatic cylinders are also more susceptible to misalignment and consequent jamming—even under normal industrial operating conditions. Airbags don't jam in place, as cylinders often due in harsh environments. There are no internal moving parts which may become cockeyed due to unbalanced forces—the pressure within the bag is transmitted equally throughout the volume of the bag and over its entire surface area. Cylinder-based systems accommodated such misalignments by adding joints (such as clevis plates or universal joints) to provide flex at connection points. However, adding joints or adding bending axes to existing joint connections, merely compounds the problems discussed above relating to wear surfaces. Airbags will continue to operate reliably even with sore misalignment without need for additional joint connections or additional bend axes on existing joints—the bag itself can accommodate much of the out-of-axis force created by minor misalignments.

Another problem associated with material handling robots is that of positioning a load prior to pickup by the robot end effector. Correct load positioning is a particular problem for soft goods such as bags of powder coming off a conveyor because they deform easily during handling. Robots which utilize an overhead pickup orientation, such as when transferring from a conveyor to stack bags of powder onto shipping pallets in an alternating orientation for stability, must ensure the bags are properly positioned in the end effector grip. Positioning is critical first to ensure the pick up occurs, but also to prevent unbalanced forces on the robot during rapid movement, and to ensure precise load placement during drop off. Positioning loads prior to pick up is particularly critical when the loads are bags of abrasive or chemically corrosive materials, because dropping or damaging the bags will release the product and exacerbate the environmental problems already prevalent in the area. Existing solutions generally utilize some sort of pusher cycled by a pneumatic cylinder. Although positioning is not a problem unique to harsh environments, harsh environments create the same problems as described above relating to pneumatic cylinders. Airbag operated positioning devices operate more reliably in such environments, which in turns leads to fewer damaged bags releasing powder which contributes to the harsh environment—a virtuous cycle.

Yet another problem associated with material handling robots operating in harsh environments is that actuators may fail singly, or actuator degradation may occur even without complete failure. Thus, in an end effector having left and right-side operators, degradation may cause one side to operate more slowly, or may cause one side to be more "sticky" than the other, such that the load is gripped properly by one side, but poorly or not at all by the other side, leading to inaccurate stacking and placement, or damaged loads which release yet more harmful dust and particulates. This sort of degraded operation may not be detected by sensors in time to prevent load failures, or requires additional sensors which increase costs and maintenance—and add failure points to the system. In such cases, it would be useful to incorporate a synchronizer linking the operators so that they open and close at the same speed, and so when one side "sticks" force is transferred from the opposing side to un-stick the operator, freeze both in place.

Airbags are not new. However, while airbags have been used for lifting loads, the inventors are not aware of any use of airbags to operate intricate mechanical systems such as a robot end effector. The use of airbags require a differing design approach which has not previously been fully appreciated in the art.

SUMMARY AND ADVANTAGES

A harsh environment robot end effector includes an end effector frame connectable to a material handling robot, one or more pickup arms rotatingly coupled to the frame, and pickup arm airbag actuator air bags for opening and closing the pickup arms. One or more positioning palms may be provided, which are rotatingly coupled to the end effector frame and provided with actuator air bags for opening and closing. One or more adjustable pushdowns having airbags attached to their heads are provided to grip a load between the pushdown and pickup arm. A mechanical synchronizer may be provided to couple the pickup arms.

The harsh environment robot end effector of the present invention presents numerous advantages, including: (1) substantially improved reliability in harsh operating environments; (2) enhanced lifetime in harsh operating environments; (3) easier alignment of components; (4) reduced maintenance requirements; (5) reduced use of environmentally harmful lubricants; (6) synchronized operation of left and right-side operators; (7) improved precision in load pickup and placement; and, (8) reduced component costs.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

The following list of drawing references numbers is provided for convenience in referring to the included FIGS. 1-9:

R Robot Arm
10 Improved End Effector
12 End Effector Frame
14 Base Plate
16 Adjustment Cam Handle
18 Male Threaded Shaft
20 Female Threaded Eye Bolt
21 Eye Bolt Head
22 Rotating Lever Joint
23 Cam Portion
24 Handle
26 Spacer
28 Stopper
30 First Frame Plate
32 First Common Shaft
34 First Common Shaft Bearings
36 First Positioning Palm Bracket
38 First Positioning Palm
40 First Positioning Palm Shaft Access
42 First Positioning Palm Opening Airbag Actuator
44 First Positioning Palm Opening Airbag Actuator First End
46 First Positioning Palm Opening Airbag Actuator Second End
48 First Positioning Palm Opening Airbag Actuator Bracket
50 First Positioning Palm Closing Airbag Actuator
52 First Positioning Palm Closing Airbag Actuator First End
54 First Positioning Palm Closing Airbag Actuator Second End
56 First Positioning Palm Closing Airbag Actuator Bracket
58 First Pickup Arm
60 Pickup Arm Fingers
62 First Pickup Arm Shaft Keyless Hub
64 First Pickup Arm Opening Airbag Actuator
66 First Pickup Arm Opening Airbag Actuator First End
68 First Pickup Arm Opening Airbag Actuator Second End
70 First Pickup Arm Opening Airbag Actuator Bracket
72 First Pickup Arm Closing Airbag Actuator
74 First Pickup Arm Closing Airbag Actuator First End
76 First Pickup Arm Closing Airbag Actuator Second End
78 First Pickup Arm Closing Airbag Actuator Bracket
90 Second Frame Plate
92 Second Common Shaft
94 Second Common Shaft Bearings
96 Second Positioning Palm Bracket
98 Second Positioning Palm
100 Second Positioning Palm Shaft Receiver
102 Second Positioning Palm Opening Airbag Actuator
104 Second Positioning Palm Opening Airbag Actuator First End
106 Second Positioning Palm Opening Airbag Actuator Second End
108 Second Positioning Palm Opening Airbag Actuator Bracket
110 Second Positioning Palm Closing Airbag Actuator
112 Second Positioning Palm Closing Airbag Actuator First End
114 Second Positioning Palm Closing Airbag Actuator Second End
116 Second Positioning Palm Closing Airbag Actuator Bracket
118 Second Pickup Arm
120 Second Pickup Arm Fingers
122 Second Pickup Arm Shaft Keyless Hub
124 Second Pickup Arm Opening Airbag Actuator
126 Second Pickup Arm Opening Airbag Actuator First End
128 Second Pickup Arm Opening Airbag Actuator Second End
130 Second Pickup Arm Opening Airbag Actuator Bracket
132 Second Pickup Arm Closing Airbag Actuator
134 Second Pickup Arm Closing Airbag Actuator First End
136 Second Pickup Arm Closing Airbag Actuator Second End
138 Second Pickup Arm Closing Airbag Actuator Bracket
150 First Tie Rod Hub
152 Second Tie Rod Hub
154 Tie Rod
156 Tie Rod First End
158 Tie Rod Second End
160 Tie Rod Adjustment Mechanism
162 Tie Rod Gear Teeth
164 Tie Rod Adjustment Gear
166 Tie Rod Locking Bolt
168 First Rotating Joint
170 Second Rotating Joint
180 First Pushdown
182 First Pushdown Bracket
184 First Pushdown Bracket First End
186 First Pushdown Bracket Second End
188 First Pushdown Bracket Slot
190 First Pushdown Head
192 First Pushdown Airbag
194 Second Pushdown
196 Second Pushdown Bracket
198 Second Pushdown Bracket First End
200 Second Pushdown Bracket Second End
202 Second Pushdown Bracket Slot
204 Second Pushdown Head
206 Second Pushdown Airbag
208 Position Sensor
210 First Linear Bearing
212 Second Linear Bearing

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In this Specification, reference to a "powder bag" or "bag of powder" is intended to include bags of powder product, as well as other loose or granular products such as concrete, sand, silica, salt, aggregate, sawdust, wood chips, flour, grain, bead materials, fertilizer and similar loose and/or dust-generating material contained in bags, sacks, sealed nets, boxes or other containers.

In this Specification, reference to "air" in relation to air-operated components (e.g. air bags, air valves, etc.) is intended to be synonymous with "pneumatic" and/or "gas", and includes any pneumatic gas, such as air, nitrogen, argon, or other gases used to operate pneumatic components.

Actuation and deactivation of pneumatic components is accomplished through air control valves to either port pressurized gas to an airbag actuator vent such gas from an airbag actuator through connecting air tubing and fittings. Air control valves, which are commonly solenoid or hydraulically operated, are controlled by the robot controller or a higher level control system operating with the robot. The selection and operation of the air control valves and air fittings which connect air actuated components to their pressure sources are well understood in the art and therefore not described herein.

Referring to FIGS. 1-9, a harsh environment robot end effector includes a robot end effector, having an end effector frame connectable to a material handling robot; a shaft mounted to the frame; a pickup arm rotatingly coupled to the shaft; a pickup arm closing airbag actuator having a first end coupled to the frame and a second end to coupled to the pickup arm; and, a pickup arm opening airbag actuator having a first end coupled to the frame and a second end coupled to the arm. A harsh environment robot end effector may include a positioning palm rotatingly mounted to the shaft; a positioning palm closing airbag actuator having a first end coupled to the frame and a second end to coupled to the positioning palm; and, a positioning palm opening airbag actuator having a first end coupled to the frame and a second end coupled to the positioning palm. A harsh environment robot end effector may include a pushdown, the pushdown having an adjustable pushdown bracket coupled to the end effector frame and a pushdown air bag coupled to the pushdown bracket.

Again referring to FIGS. 1-9, a harsh environment robot end effector includes an end effector frame connectable to a material handling robot; first and second pickup arms rotatingly coupled to the frame; first and second pickup arm closing airbag actuators, each of the pickup arm closing actuators having a first end coupled to the frame and a second end coupled to the respective first or second arm; and, first and second pickup arm opening airbag actuators, each of the pickup arm opening actuators having a first end coupled to the frame and a second end coupled to the respective first or second arm. A harsh environment robot end effector may include a mechanical synchronizer linking the first pickup arm to the second arm.

Again referring to FIGS. 1-9, a harsh environment robot end effector includes opposing first and second positioning palms rotatingly coupled to the frame; first and second positioning palm closing airbag actuators, each of the palm closing actuators having a first end coupled to the frame and a second end coupled to the respective first or second positioning palm; and, first and second positioning palm opening airbag actuators, each of the palm opening actuators having a first end coupled to the frame and a second end coupled to the respective first or second positioning palm.

Again referring to FIGS. 1-9, a harsh environment robot end effector includes first and second pushdowns, each of the first and second pushdowns having an adjustable pushdown bracket coupled to the frame and a pushdown airbag, wherein each of the pushdowns is aligned with corresponding the first and second arms.

Again referring to FIGS. 1-9, a harsh environment robot end effector includes an end effector frame connectable to an arm of a material handling robot, the end effector frame including a base plate and first and second frame plates adjustably mounted to the base plate in opposing parallel orientation; first and second common shaft bearings mounted to the first and second frame plates, respectively; opposing first and second common shafts supported within the first and second shaft bearings, respectively; opposing first and second positioning palms mounted to the first and second common shafts, respectively, so as to rotate freely about the shafts; a first positioning palm opening airbag actuator, the opening airbag coupled at a first end to the first frame plate, and at a second and to the first positioning palm; a first positioning palm closing airbag actuator, the closing airbag coupled at a first end to the first frame plate, and at a second end to the first positioning palm; a second positioning palm opening airbag actuator, the opening airbag coupled at a first and to the second frame plate, and at a second end to the second positioning palm; a second positioning palm closing airbag actuator, the closing airbag coupled at a first end to the second frame plate, and at a second end to the second positioning palm; opposing first and second pickup arms lockingly coupled to the first and second common shafts, respectively; a first pickup arm opening airbag actuator, the opening airbag coupled at a first end to the first frame plate, and at a second end to the first arm; a first pickup arm closing airbag actuator, the closing airbag coupled at a first end to the first frame plate, and at a second end to the first arm; a second pickup arm opening airbag actuator, the opening airbag coupled at a first end to the second frame plate, and at a second end to the second arm; a second pickup arm closing airbag actuator, the closing airbag coupled at a first end to the second frame plate, and at a second end to the second arm; and a mechanical synchronizer coupling the first pickup arm to the second pickup arm.

A mechanical synchronizer may include opposing first and second tie rod hubs lockingly coupled to the first and second common shafts, respectively; and, a tie rod including first and second ends; wherein, the first end is pivotally coupled to the first tie rod hub at a point offset from the center of rotation of the first tie rod hub, and the second end is pivotally coupled to the second be rod hub at a point antipodal to the first end connection point, such that rotation of either of the first or second tie rod hub in synch with its corresponding common shaft will induce the opposing tie rod hub and corresponding common shaft to rotate in an opposite direction.

Referring to FIGS. 1-9, an embodiment of a harsh environment robot end effector 10 is shown. End effector 10 includes an and effector frame 12 connectable to a pickup arm of a material handling robot R. End effector frame 12 includes a base plate 14 and first and second frame plates, 30 and 90, respectively, adjustably mounted to base plate 14 parallel to, and in opposing orientation to, each other. Adjustable cam handles 16 provide three-dimensional adjustment of frame plates 30 and 90 for alignment. First and second frame plates 30 and 90 are mounted to base plate 14 on opposing sides of base plate 14. In the embodiment, the opposing sides of end effector 10 are substantially similar with analogous components, though not mirror images.

Figure 8:
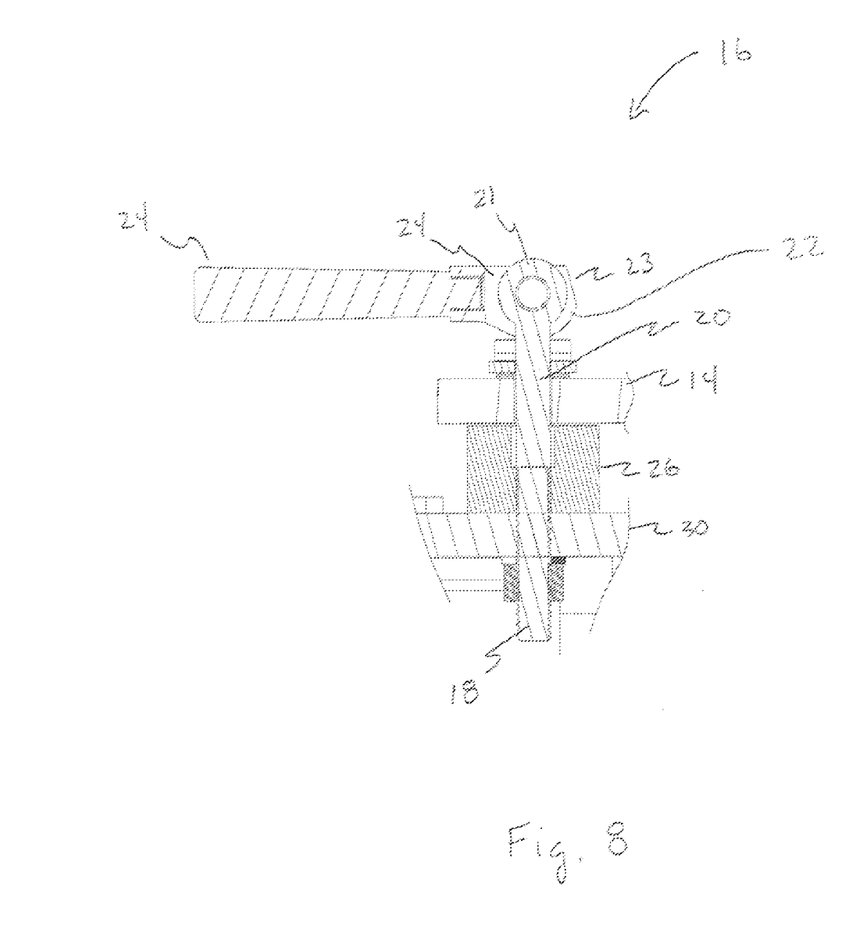
FIG. 8 shows a cut-away view of an adjustment cam handle.
Figure 9:
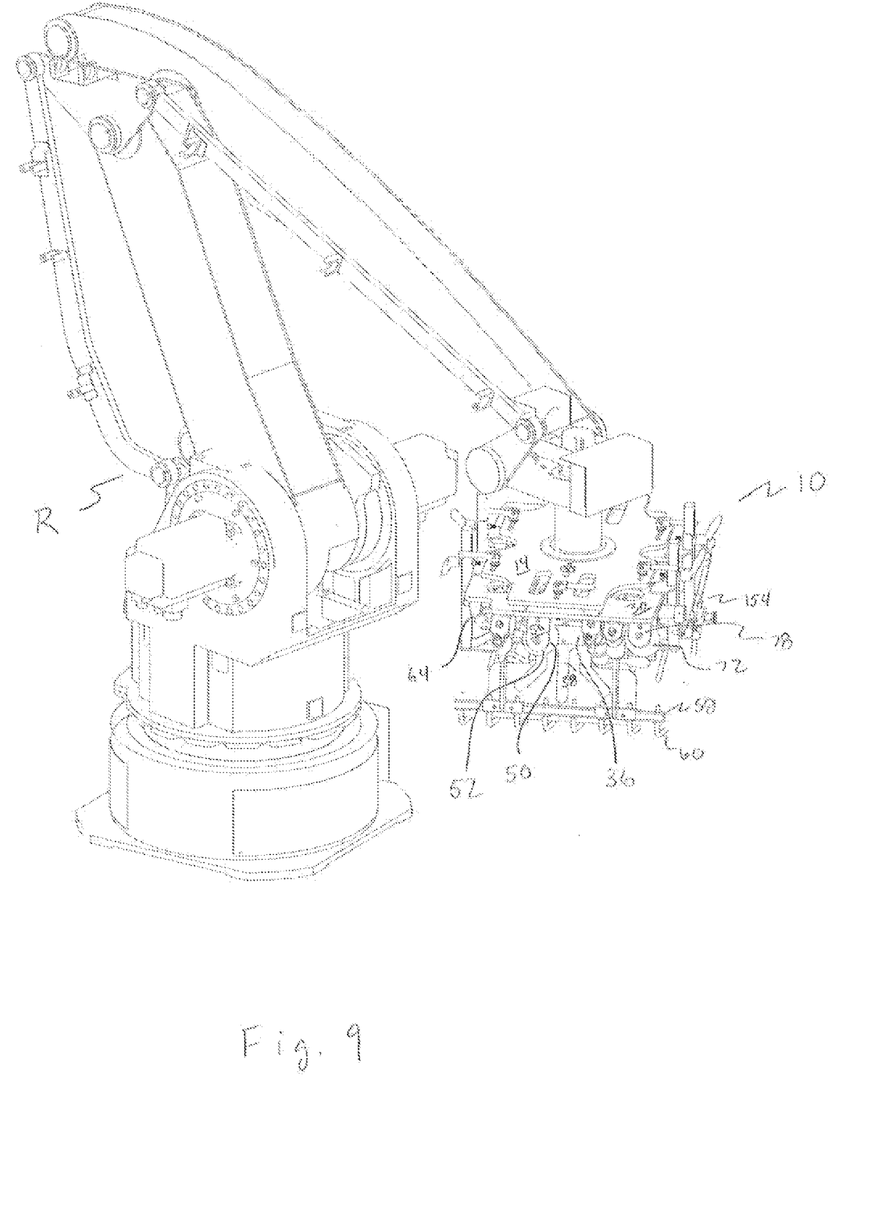
FIG. 9 shows view of a material handling robot with a harsh environment end effector.

First and second frame plates 30 and 90 must be properly aligned, relative to each other and to base plate 14, to ensure proper operation. Adjustment cam handles 16 allow for quick alignment of parts. Adjustment cam handles 16 includes an eye bolt 20 having a female threaded shaft which passes through base plate 14 to engage male threaded shaft 18, which is itself threaded into frame plate 30 (or 90). The head 21 of eye bolt 20 engages rotating lever joint 22 which connects the handle 24. Spacer 26 may be inserted between the parts to provide a gap. When handle 24 is rotated to perpendicular about joint 21/22, threaded shaft 18 and eye bolt 20 are placed in tension which clamps spacer 26 tightly between the frame plate 30 and base plate 14 to prevent relative movement. When handle 24 is rotated inline then the narrower cam portion 23 of lever joint 22 (i.e. the flat portion) decompresses the grip to allow relative movement between base plate 14 and frame plate 30 for aligning the parts. Eye bolt 20 is also free to rotate in relation to threaded shaft 18 when handle 24 is rotated to the inline position, thereby shortening or lengthening the effective length as needed.

First and second frame plates 30 and 90 are adjustably mounted to base plate 14 by first and second linear rails 210 and 212, mounted parallel to each other and extending transversely across base plate 14, which allows for setting proper spacing between first and second frame plates 30 and 90 (and thereby proper spacing between the positioning palms and arms). By loosening the adjustment cam handles 16 the frame plates are free to move along the linear rails 210 and 212. In the embodiment, fine alignment for parallelism between frame plates 30 and 90 is achieved using a cable tensioning system (not shown).

First and second common shaft bearings 34 and 94, respectively, are mounted to first and second frame plates 30 and 90, respectively. Common shaft bearings 34 and 94 are preferably sets of rotational bearings aligned along first and second frame plates 30 and 90, respectively, to support first and second common shafts 32 and 92. Common shaft bearings 34 and 94 may comprise plain bearings or may include rolling bearing elements and/or lubrication. In the embodiment common shaft bearings 34 and 94 are sealed radial bearings.

First and second common shafts 32 and 92 are mounted through and supported within first and second shaft bearings 34 and 94, respectively. First and second common shafts 32 and 92 provide common axes of rotation for their respective pickup arms and positioning palms, and connect the pickup arms and positioning palms to the frame plates through common shaft bearings 34 and 94.

Figure 1:
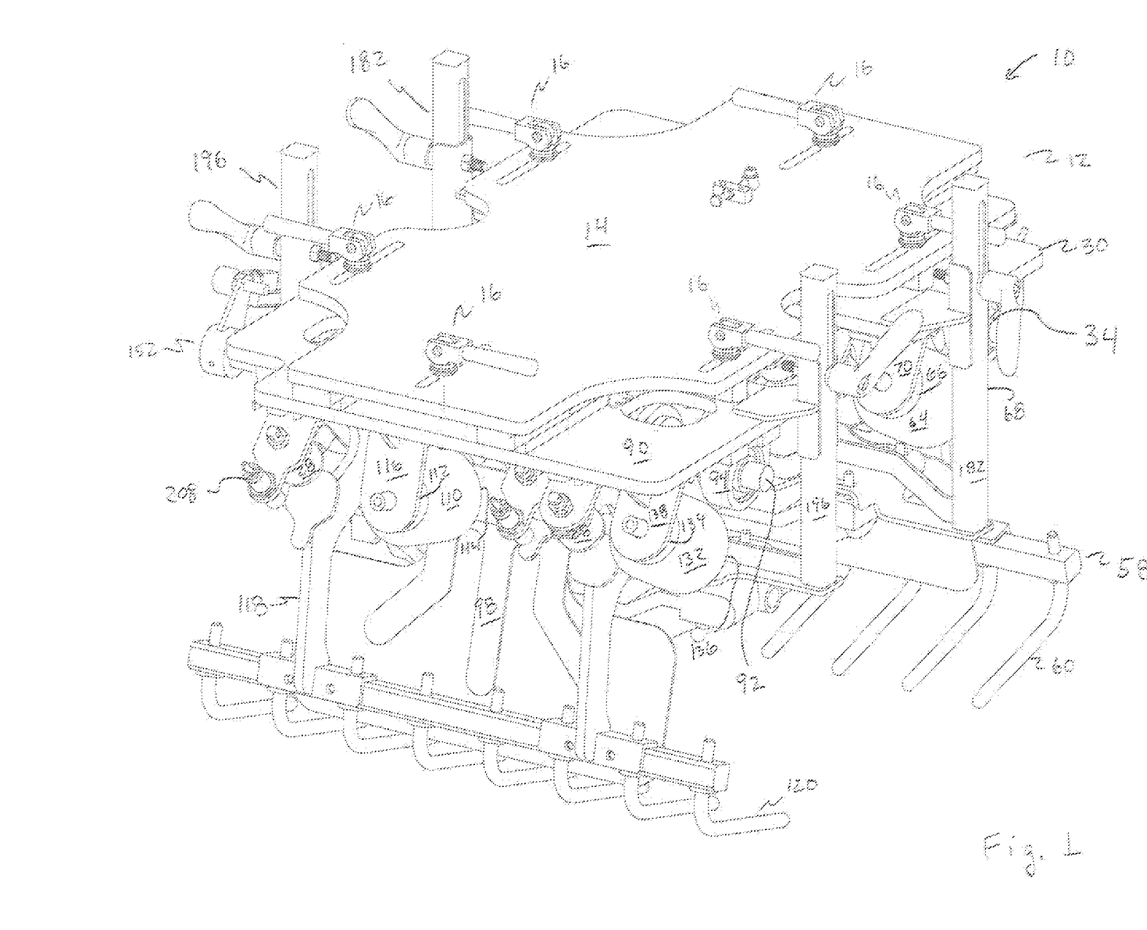
FIG. 1 shows a perspective view of a harsh environment end effector.
Figure 2:
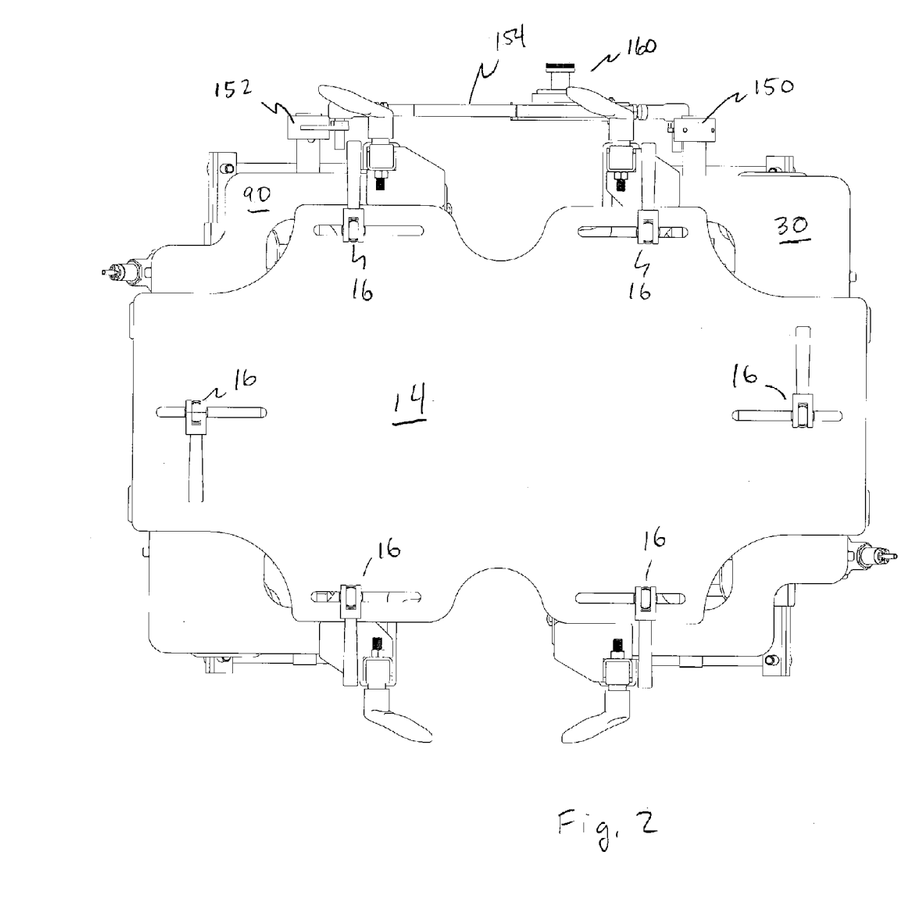
FIG. 2 shows a top view of a harsh environment end effector.
Figure 3:
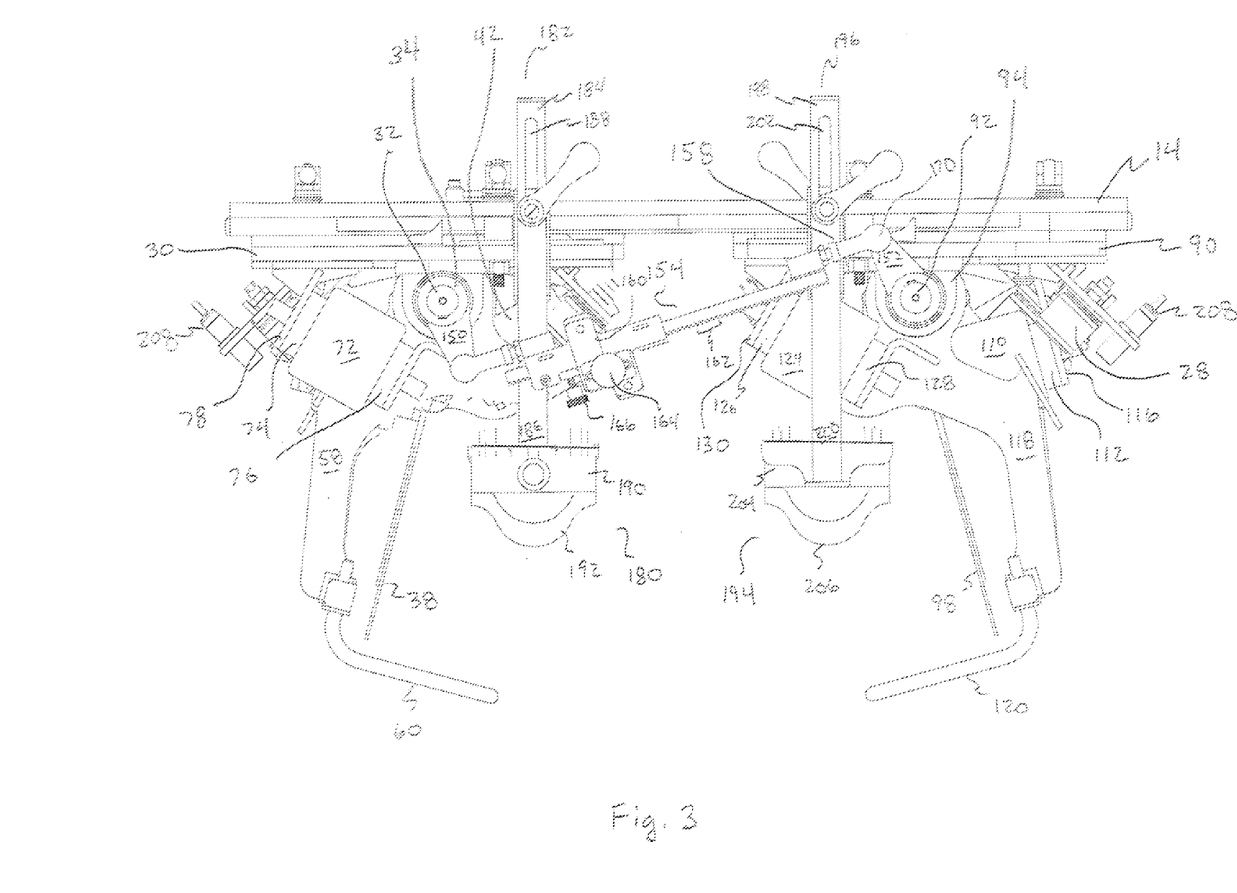
FIG. 3 shows an end-on view of a harsh environment end effector.
Figure 4:
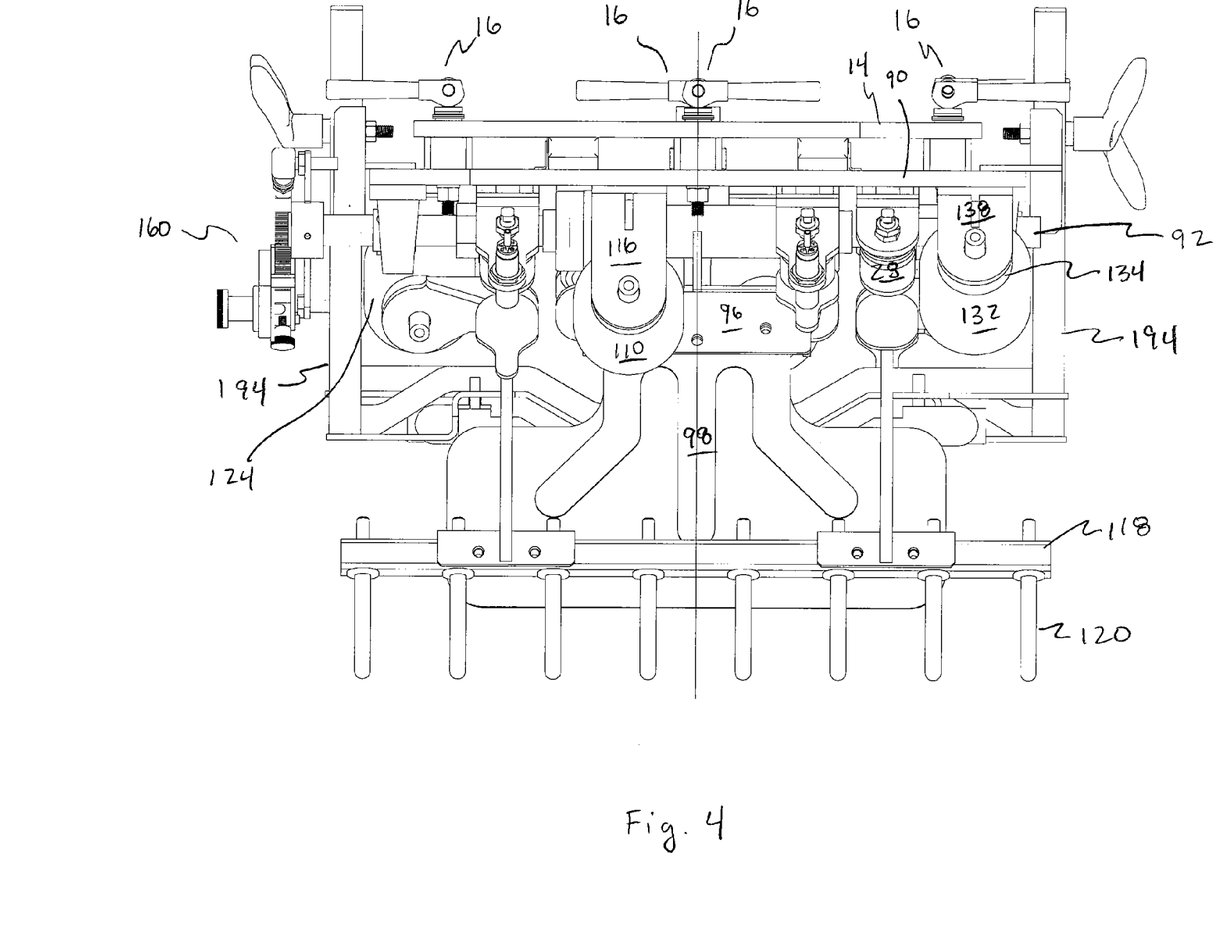
FIG. 4 shows a side view of a harsh environment end effector.
Figure 5:
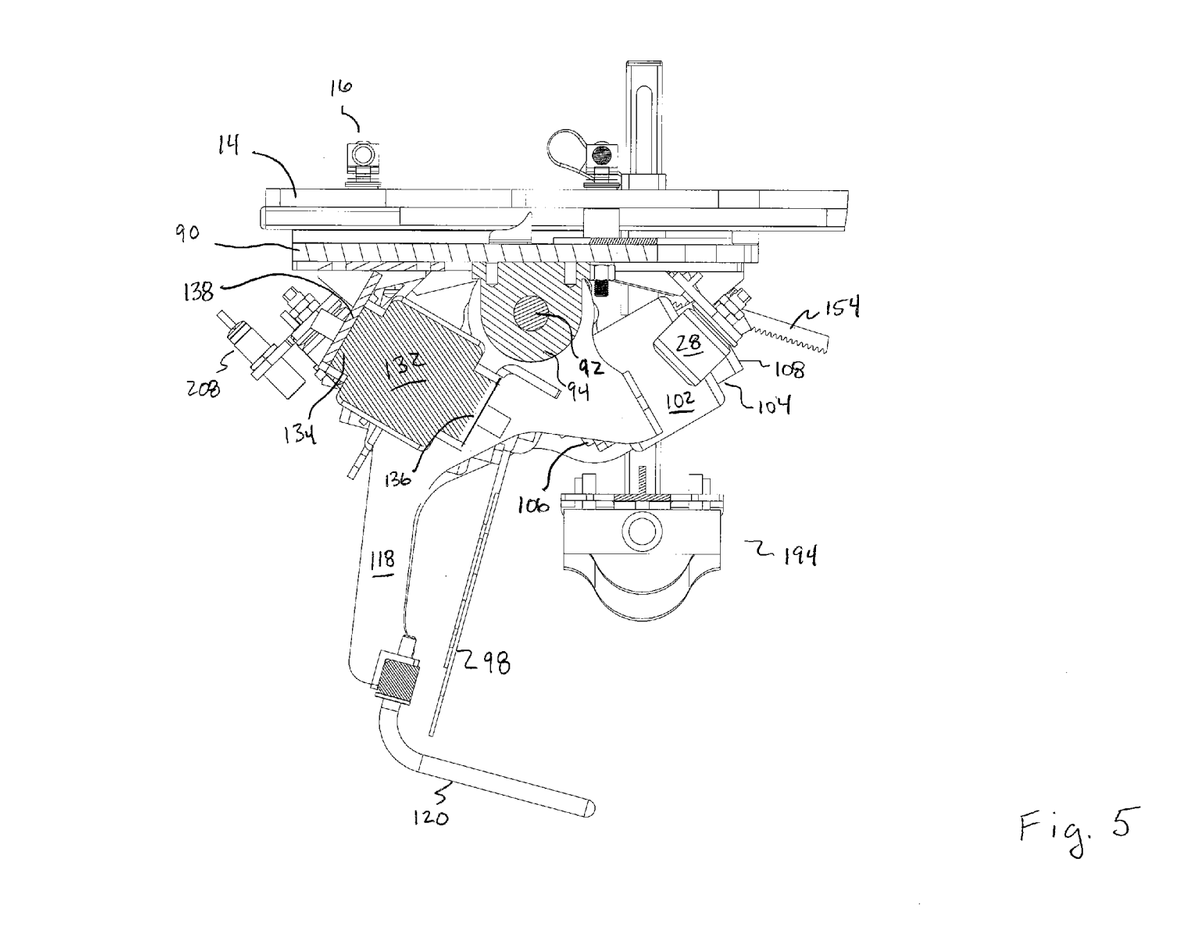
FIG. 5 shows a cut-away partial end-on view of a harsh environment end effector.
Figure 6:
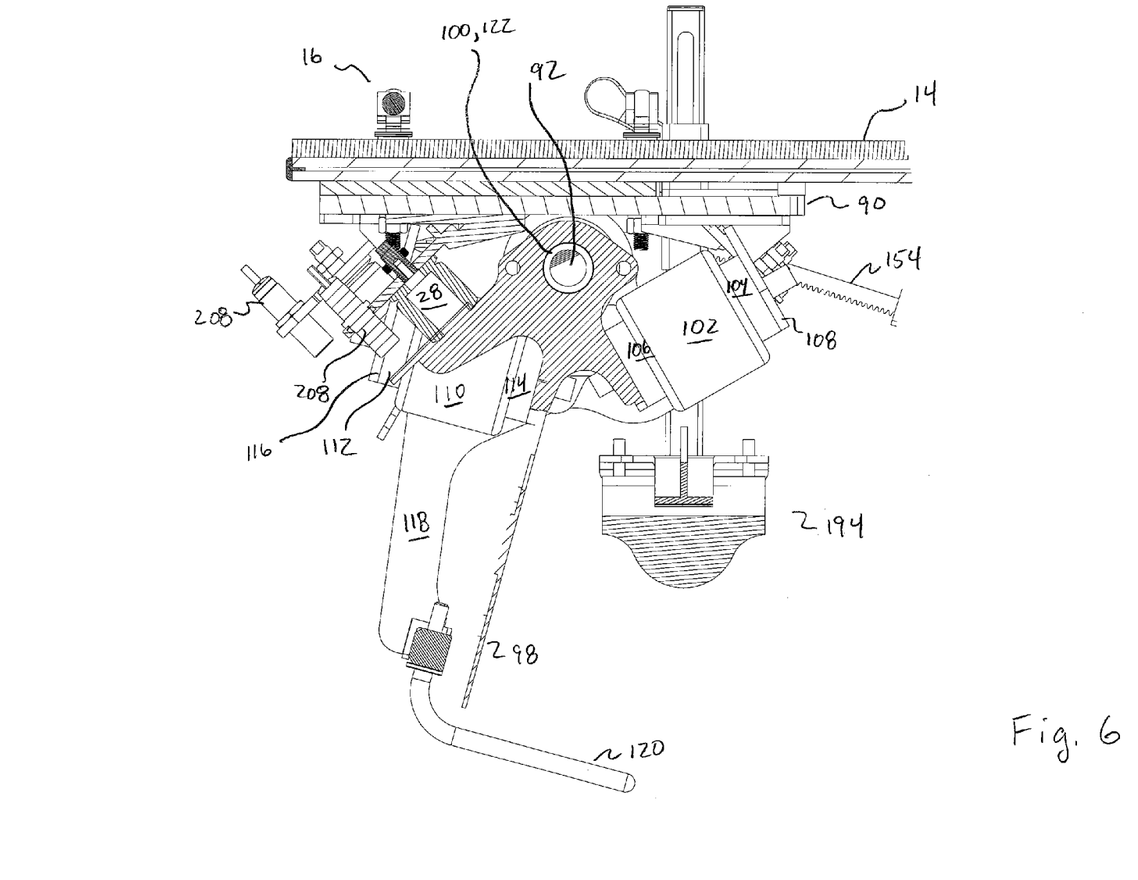
FIG. 6 shows a cut-away partial end-on view of a harsh environment end effector.
Figure 7:
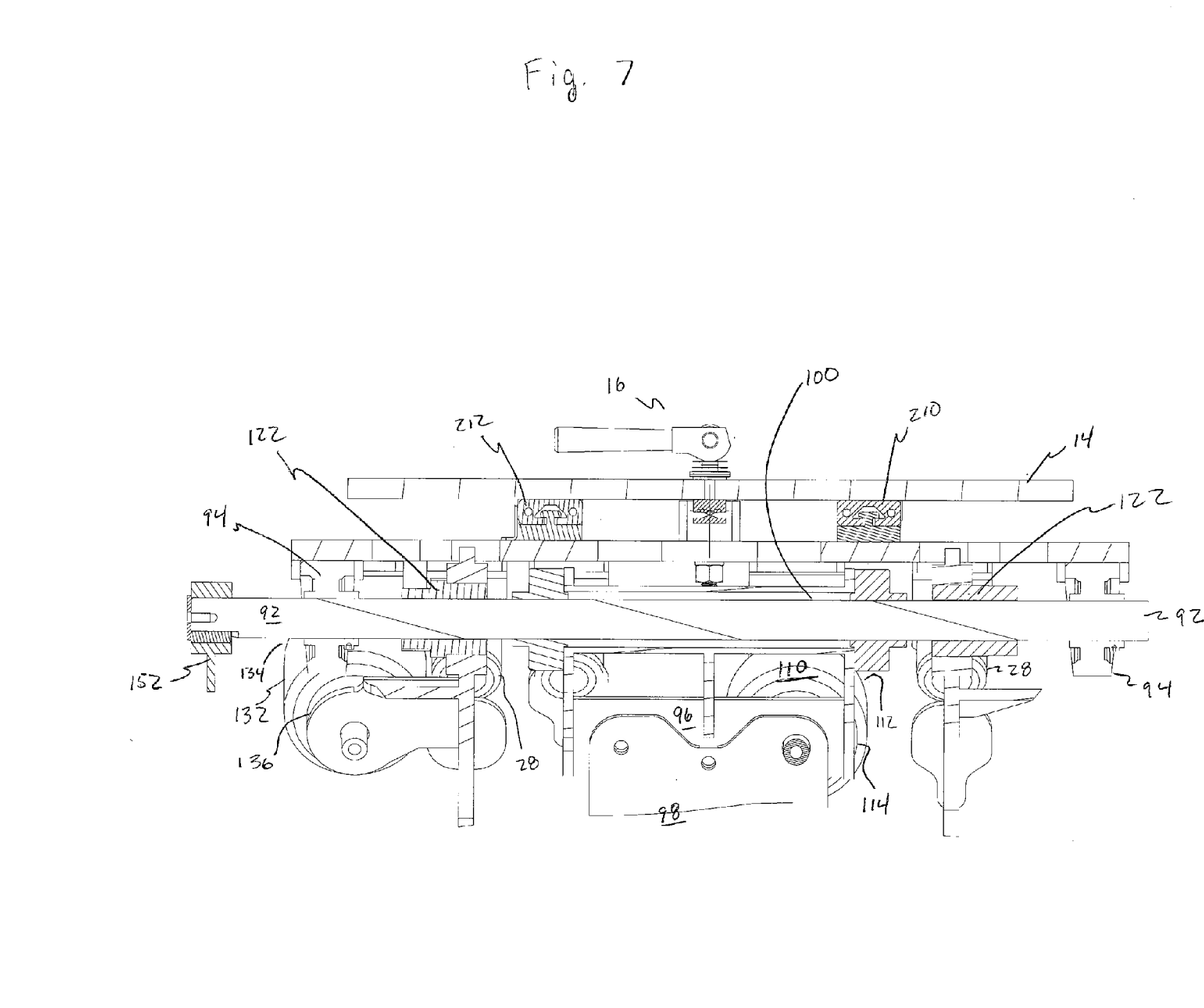
FIG. 7 shows a partial side view of the upper portion of a harsh environment end effector.

First and second positioning palms 36 and 96, respectively, are mounted to first and second common shafts 32 and 92, respectively, in opposing orientation. Positioning palms 36 and 96 include shaft receivers 40 and 100, which are through penetrations for receiving common shafts 32 and 92, respectively. Referring to FIGS. 5 & 6, the opposed first positioning palm 36 is identical in structure, having shaft receiver 40 identical to shaft receiver 100 relating to second positioning palm 96, but not visible in the view. Positioning palms 36 and 96 are not locked to common shafts 32 and 92 so that they rotate freely about the common shafts. Positioning palm brackets 36 and 96 provide coupling for positioning palms 38 and 98, respectively. The fingers of positioning palms 38 and 98 fit between the rollers of a conveyor which feeds bags of material to be transferred by robot arm R. Preferably palms 38 and 98 are separately attached pieces so they can be replaced more easily in the event a robot crash damages them.

Referring to FIGS. 5 & 6, the opposed first positioning palm 36 and opening airbag actuator 42 is identical in structure to second positioning palm 96 and opening airbag actuator 102 and coupled to corresponding structures. First positioning palm opening airbag actuator 42 is coupled at a first end 44 to first frame plate 30, and at a second end 46 (not visible in this view, but corresponding to 106) to first positioning palm 36. In the embodiment, bracket 48 (not visible in view, but corresponding to 108) extends from frame plate 30 to provide the coupling to frame plate 30.

First positioning palm closing airbag actuator 50 is coupled at a first end 52 to first frame plate 30, using bracket 56, and at a second end 54 (not visible in view, but corresponding to 114) to first positioning palm 36. Closing airbag actuator 50 and opening airbag actuator 42 are used, in opposing orientation, to ensure positive movement of positioning palm 36 on command at the desired speeds to ensure clean pickup and drop-off of loads.

Second positioning palm opening airbag actuator 102 is coupled at a first end 104 to second frame plate 90 by bracket 108, and at a second end 106 to second positioning palm 96. Second positioning palm closing airbag actuator 110 is coupled at a first end 112 to said second frame plate 90, and at a second end 114 to second positioning palm 96.

First and second pickup arms 58 and 118, respectively, are lockingly coupled to first and second common shafts 32 and 92 in opposing orientation for picking up loads, such that when the pickup arms 58 and 118 are rotated they cause their respective common shafts to rotate as well, and rotation of the shafts will rotate their corresponding pickup arms 58 and 118. In the embodiment pickup arms 58 and 118 are mounted over common shafts 32 and 92 and keyless hubs 62 and 122, respectively (62 not visible in view, but corresponding to 122), which lock shafts 32 and 92 to their respective pickup arms. Fingers 60 extend from pickup arms 58 and 118 approximately perpendicular to provide a closed support for lifting loads. Fingers 60 and 120 are sized and spaced to fit between conveyor rollers which move the bags of material to be transferred. Other layouts would be used depending on the dimensions and layout of the pickup location and the material container.

First pickup arm opening airbag actuator 64 is coupled at a first end 66 to first frame plate 30 by bracket 70 and at a second end 68 to first pickup arm 58. First pickup arm closing airbag actuator 72 is coupled at a first end 74 to first frame plate 30 by bracket 78 and at a second end 76 to first pickup arm 58.

Second pickup arm opening airbag actuator 124 is coupled at a first end 126 to second frame plate 90 by bracket 130 and at a second end 128 to second pickup arm 118. Second pickup arm closing airbag actuator 132 is coupled at a first end 134 to second frame plate 90 by bracket 138 and at a second end 136 to second pickup arm 118.

Opposing first and second tie rod hubs 150 and 152, respectively, are lockingly coupled to first and second common shafts 32 and 92, respectively, so that they rotate with their respective common shafts. In the embodiment, first and second tie rod hubs 150 and 152 are keyed to common shafts 32 and 92. In the embodiment tie rod hubs 150 and 152 are lever arms, but could be round or other shapes as well.

Adjustable tie rod 154 connects first and second tie rod hubs 150 and 152, thereby coupling first pickup arm 58 to second pickup arm 118 to provide mechanical synchronization of the common shafts 32 and 92. Tie rod 154 is pivotally coupled at a first end 156 to first tie rod hub 150 by first rotating joint 168 at a location that is offset from the center of rotation of the first hub (which is the first common shaft centerline), and pivotally coupled at a second end 158 to second tie rod hub 152 by second rotating joint 170 at a location that is offset from the center of rotation of the second hub (which is the second common shaft centerline). Tie rod hubs 150 and 152 are coupled at antipodal points relative to each other—in the embodiment at approximately top and bottom points—so that rotation of one common shaft in a clockwise direction will apply torque on the opposing common shaft in the counterclockwise direction and vice versa.

In the embodiment, adjustable tie rod 154 includes an adjustment mechanism 160 to adjust the length of the tie rod 154. In the embodiment tie rod adjustment mechanism 160 includes adjustment gear 164 which meshes with tie rod teeth 162 to "walk" along tie rod 154. Tie rod locking bolt 166 compresses against tie rod 154 and inserts between tie rod teeth 162 to prevent movement during operation.

Referring again to FIGS. 1-9, pushdown 180 is provided to assist gripping loads during pickup and movement, and to assist in releasing the load during drop off. Pushdown 180 includes an adjustable pushdown bracket 182 having a first end 184 and a second end 186. Pushdown bracket 182 is coupled to end effector frame 12 at base plate 14. Vertical adjustment is provided by a locking adjustment cam handle 16 within slot 188. Pushdown head 190 is provided at pushdown bracket second end 186 to provide a mounting point for pushdown airbag 192.

In the embodiment, a second pushdown 194 is provided, including second pushdown bracket 196 having first end 198 and second end 200, mounted to base plate 14 by a locking adjustment cam handle 16 within slot 202. Pushdown head 204 at pushdown bracket second end 200 provides a mounting point for second pushdown airbag 206.

In the embodiment, first and second pushdowns 180 and 194, respectively, are positioned distally from each other on opposing sides of end effector frame 12 proximal to first and second pickup arms 58 and 118, respectively, such that the pushdowns 180 and 194 are aligned with their respective pickup arms. When a pickup arm 58/118 is in a closed position, the fingers 60/120 of the pickup arm which are thereby positioned under the load are in opposing position to the respective pushdown, so the load can be compressed and gripped between them A single wider pushdown could also be used. Alternatively, for end effectors with single pickup arms a single corresponding pushdown could be used. In the embodiment, first and second pushdowns 180 and 194 are adjustable, but non-moving, so that engagement with a load is achieved by inflation of pushdown airbags 192 and 206 to compress the load against the pickup arm fingers 60 and 120, respectively.

Referring again to the embodiment shown in FIGS. 1-9, in operation a harsh environment end effector can be used to transfer bags of powder from a distribution conveyor to a shipping pallet. Robot arm R moves to position the improved end effector 10 over a load on a roller conveyor for pickup. First and second positioning palms 38 and 98 straddle the load with palm fingers fitting between the conveyor rollers, with first and second positioning palm opening airbag actuators 42 and 102 actuated (i.e. pressurized) and first and second pickup arm opening airbag actuators 64 and 124 actuated, and the corresponding palm closing airbag actuators 50 and 110 and pickup arm closing airbag actuators 72 and 130 deactivated (i.e. depressurized), in order to hold the positioning palms and pickup arms open.

After positioning the end effector 10, first and second positioning palm closing airbag actuators 50 and 110 are actuated to close positioning palms 38 and 98 toward each other, thereby moving the load into proper alignment for pickup. In this case the load is centered between first and second pickup arms 58 and 118 (i.e. transversely), hut not necessarily longitudinally. With positioning palms 38 and 98 remaining closed, first and second pickup arm opening airbag actuators 64 and 124 deactivate while first and second pickup arm closing airbag actuators 72 and 132 actuate, causing first and second pickup arms 58 and 118 to close with first and second pickup arm fingers 60 and 120 under the load between the conveyor rollers. The mechanical synchronizer including tie rod 154 ensures that first and second pickup arms 58 and 118 move together cooperatively to prevent transverse displacement of the load or clamping and lifting with one arm open. First and second pushdown airbags 192 and 206 inflate to compress and grip the load between them and fingers 60 and 120. Robot arm R then lifts the load and positions it above the shipping pallet at a position based on a pre-programmed stacking pattern—in this case an alternating stacked pattern.

To release the load the operations are essentially reversed. First and second pushdown airbags 192 and 206 deflate to release the grip. First and second pickup arm closing airbag actuators 72 and 132 deactivate while first and second pickup arm opening airbag actuators 64 and 124 actuate to open the pickup arms 58 and 118, releasing the load onto the stack while positioning palms 38 and 98 remain closed to act as guides. First and second positioning palm opening airbag actuators 42 and 102 then actuate and first and second positioning palm closing airbag actuators 50 and 110 deactivate to open positioning palms 38 and 98. After releasing the bad, robot arm R returns to the pickup point or to some other programmed position.

Stops 28 prevent over travel by pickup arms and palms and provide shock absorption. Position sensors 208 provide inputs to the robot control system confirming component positioning to indicate conditions are safe for the next movement or to indicate a crash or other failure. In the embodiment position sensors 208 are NPN capacitive proximity sensors, which are commonly available and reliable, but other sensors could be used.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A robot end effector comprising:
an end effector frame connectable to a material handling robot;
a shaft mounted to said frame;
a pickup arm rotatingly coupled to said shaft;
a pickup arm closing airbag actuator having a first end coupled to said frame and a second end coupled to said pickup arm;
a pickup arm opening airbag actuator having a first end coupled to said frame and a second end coupled to said arm; and,
a pushdown, said pushdown comprising an adjustable pushdown bracket coupled to said end effector frame and a pushdown air bag coupled to said pushdown bracket.

2. A robot end effector comprising:
an end effector frame connectable to a material handling robot;
first and second pickup arms rotatingly coupled to said frame;
first and second pickup arm closing airbag actuators, each of said pickup arm closing actuators having a first end coupled to said frame and a second end coupled to the respective first or second arm;
first and second pickup arm opening airbag actuators, each of said pickup arm opening actuators having a first end coupled to said frame and a second end coupled to the respective first or second arm;
opposing first and second positioning palms rotatingly coupled to said frame;
first and second positioning palm closing airbag actuators, each of said palm closing actuators having a first end coupled to said frame and a second end coupled to the respective first or second positioning palm; and,
first and second positioning palm opening airbag actuators, each of said palm opening actuators having a first end coupled to said frame and a second end coupled to the respective first or second positioning palm.

3. A robot end effector comprising:
an end effector frame connectable to a material handling robot;
first and second pickup arms rotatingly coupled to said frame;
first and second pickup arm closing airbag actuators, each of said pickup arm closing actuators having a first end coupled to said frame and a second end coupled to the respective first or second arm;
first and second pickup arm opening airbag actuators, each of said pickup arm opening actuators having a first end coupled to said frame and a second end coupled to the respective first or second arm;
a mechanical synchronizer coupling said first pickup arm to said second arm;
opposing first and second positioning palms rotatingly coupled to said frame;
first and second positioning palm closing airbag actuators, each of said palm closing actuators having a first end coupled to said frame and a second end coupled to the respective first or second positioning palm; and,
first and second positioning palm opening airbag actuators, each of said palm opening actuators having a first end coupled to said frame and a second end coupled to the respective first or second positioning palm.

4. A robot end effector comprising:
an end effector frame connectable to a material handling robot;
first and second pickup arms rotatingly coupled to said frame;
first and second pickup arm closing airbag actuators, each of said pickup arm closing actuators having a first end coupled to said frame and a second end coupled to the respective first or second arm;
first and second pickup arm opening airbag actuators, each of said pickup arm opening actuators having a first end coupled to said frame and a second end coupled to the respective first or second arm;
first and second pushdowns, each of said first and second pushdowns including an adjustable pushdown bracket coupled to said frame and a pushdown airbag, wherein each of said pushdowns is aligned with corresponding said first and second arms.

5. A robot end effector comprising:
an end effector frame connectable to a material handling robot;
first and second pickup arms rotatingly coupled to said frame;
first and second pickup arm closing airbag actuators, each of said pickup arm closing actuators having a first end coupled to said frame and a second end coupled to the respective first or second arm;
first and second pickup arm opening airbag actuators, each of said pickup arm opening actuators having a first end coupled to said frame and a second end coupled to the respective first or second arm;
a mechanical synchronizer coupling said first pickup arm to said second arm;
first and second pushdowns, each of said first and second pushdowns including an adjustable pushdown bracket coupled to said frame and a pushdown airbag, wherein each of said pushdowns is aligned with corresponding said first and second arms.

6. A robot end effector, comprising:
an end effector frame connectable to an arm of a material handling robot, said end effector frame including a base plate and first and second frame plates adjustably mounted to said base plate in opposing parallel orientation;
first and second common shaft bearings mounted to said first and second frame plates, respectively;
first and second common shafts supported within said first and second shaft bearings, respectively;
opposing first and second positioning palms mounted to said first and second common shafts, respectively, so as to rotate freely about said shafts;
a first positioning palm opening airbag actuator, said opening airbag coupled at a first end to said first frame plate, and at a second end to said first positioning palm;
a first positioning palm closing airbag actuator, said closing airbag coupled at a first end to said first frame plate, and at a second end to said first positioning palm;
a second positioning palm opening airbag actuator, said opening airbag coupled at a first end to said second frame plate, and at a second end to said second positioning palm;
a second positioning palm closing airbag actuator, said closing airbag coupled at a first end to said second frame plate, and at a second end to said second positioning palm;
opposing first and second pickup arms lockingly coupled to said first and second common shafts, respectively;
a first pickup arm opening airbag actuator, said opening airbag coupled at a first end to said first frame plate, and at a second end to said first arm;

a first pickup arm closing airbag actuator, said closing airbag coupled at a first end to said first frame plate, and at a second end to said first arm;

a second pickup arm opening airbag actuator, said opening airbag coupled at a first end to said second frame plate, and at a second end to said second arm;

a second pickup arm closing airbag actuator, said closing airbag coupled at a first end to said second frame plate, and at a second end to said second arm; and, a mechanical synchronizer coupling said first pickup arm and said second pickup arm.

7. A robot end effector as in claim 6, wherein said mechanical synchronizer comprises:

first and second tie rod hubs lockingly coupled to said first and second common shafts, respectively; and, a tie rod including first and second ends;

wherein, said first end is pivotally coupled to said first tie rod hub at a point offset from the center of rotation of said first tie rod hub, and said second end is pivotally coupled to said second tie rod hub at a point antipodal to said first end connection point, such that rotation of either of said first or second tie rod hub in synch with its corresponding common shaft will induce the opposing tie rod huh and corresponding common shaft to rotate in an opposite direction.

8. A robot end effector as in claim 6, further comprising:

a pushdown, said pushdown comprising an adjustable pushdown bracket coupled to said frame and a pushdown air bag coupled to said pushdown bracket.

9. A robot end effector as in claim 6, further comprising:

first and second pushdowns positioned proximal to said first and second pickup arms, respectively, and extending between said first and second pickup arms, wherein each of said first and second pushdowns includes an adjustable pushdown bracket coupled to said frame and a pushdown air bag coupled to said pushdown bracket.

* * * * *